United States Patent
Pulaski (10) Patent No.: US 10,642,801 B2
(45) Date of Patent: May 5, 2020

(54) SYSTEM FOR DETERMINING THE IMPACT TO DATABASES, TABLES AND VIEWS BY BATCH PROCESSING

(71) Applicant: BANK OF AMERICA CORPORATION, Charlotte, NC (US)

(72) Inventor: James C. Pulaski, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 497 days.

(21) Appl. No.: 15/689,781

(22) Filed: Aug. 29, 2017

(65) Prior Publication Data
US 2019/0065533 A1 Feb. 28, 2019

(51) Int. Cl.
*G06F 16/21* (2019.01)
*G06F 9/48* (2006.01)
*G06F 16/22* (2019.01)

(52) U.S. Cl.
CPC ............ *G06F 16/21* (2019.01); *G06F 9/4881* (2013.01); *G06F 16/217* (2019.01); *G06F 16/2282* (2019.01)

(58) Field of Classification Search
CPC .... G06F 16/217; G06F 16/2282; G06F 16/21; G06F 9/4881
USPC ........................................................ 707/609
See application file for complete search history.

(56) References Cited

U.S. PATENT DOCUMENTS

| | | | |
|---|---|---|---|
| 5,452,449 A | 9/1995 | Baldwin, Jr. et al. | |
| 5,893,905 A | 4/1999 | Main et al. | |
| 5,995,980 A | 11/1999 | Olson et al. | |
| 6,505,249 B1 | 1/2003 | Rehkopf | |
| 7,421,153 B1 | 9/2008 | Ronca et al. | |
| 7,831,621 B1 | 11/2010 | Banks et al. | |
| 8,060,553 B2 | 11/2011 | Mamou et al. | |
| 8,612,299 B2 | 12/2013 | Petit et al. | |
| 8,713,579 B2 | 4/2014 | Cardelli et al. | |
| 10,338,958 B1* | 7/2019 | Kamboj | G06F 16/254 |
| 2004/0044642 A1* | 3/2004 | Fujii | G06F 16/2358 |
| 2004/0098719 A1 | 5/2004 | Smith et al. | |
| 2006/0069717 A1 | 3/2006 | Mamou et al. | |
| 2006/0106825 A1 | 5/2006 | Cozzi | |
| 2006/0294521 A1* | 12/2006 | Wietlisbach | G06F 9/45512 718/101 |
| 2007/0129146 A1 | 6/2007 | Tzruya et al. | |
| 2007/0234363 A1* | 10/2007 | Ferrandiz | G06F 9/4843 718/101 |
| 2008/0071987 A1 | 3/2008 | Kam et al. | |

(Continued)

*Primary Examiner* — Robert W Beausoliel, Jr.
*Assistant Examiner* — Pedro J Santos
(74) *Attorney, Agent, or Firm* — Michael A. Springs; Moore & Van Allen PLLC; James C. Edwards (57) ABSTRACT

A system for identifying the databases, database tables and views that are impacted by batch processing tasks and the activities performed on the databases, databases tables and views as a result of the batch processing tasks. Static script files and the associated scripts are parsed to identify predetermined keywords, and types of configuration settings and the command line and/or options passed to the script from a scheduler are examined to determine how the logic in the script operates. Based on the keywords, type of configuration settings and knowledge as to how script operates, the databases, databases tables and/or views that are impacted by batch processing task can be determined and the associated activities performed on the databases, databases tables and views identified.

20 Claims, 4 Drawing Sheets

(56) References Cited

U.S. PATENT DOCUMENTS

| | | |
|---|---|---|
| 2008/0120618 A1 | 5/2008 | Collins et al. |
| 2008/0276239 A1 | 11/2008 | Collins et al. |
| 2011/0113429 A1 | 5/2011 | Oda |
| 2011/0173619 A1 | 7/2011 | Fish |
| 2013/0073586 A1 | 3/2013 | Aubry et al. |
| 2015/0019478 A1* | 1/2015 | Buehne ................ G06F 16/119 707/609 |
| 2015/0347193 A1 | 12/2015 | Wolfson et al. |
| 2015/0381520 A1* | 12/2015 | Watanabe ............ G06F 9/4881 709/226 |
| 2019/0258462 A1* | 8/2019 | Kathmann ............ G06F 40/169 |

\* cited by examiner

SYSTEM FOR DETERMINING THE IMPACT TO DATABASES, TABLES AND VIEWS BY BATCH PROCESSING

FIELD OF THE INVENTION

The present invention is generally directed to computer processing and, more specifically, determining the impact to databases, databases tables and views by batch processing.

BACKGROUND

Batch processing is typically a highly involved form of computer processing conducted at an enterprise level. In batch processing a set of tasks, otherwise referred to as jobs are executed automatically via a scheduling system, such that the tasks run at predetermined times. In large enterprises, in which each task/job is conducted on a frequent basis, such as daily or the like, batch processing may occur continuously (i.e., a 24/7 operation).

The complexity of such batch processing makes it difficult to assess which databases and, more specifically, which tables and/or views within the databases are impacted by the batch processes (i.e., the specific tasks/jobs). In addition to assessing which databases, including or views are impacted by batch processes, it also equally difficult to determine which actions are being taken on an identified database, table and/or view. For example, assessing whether a database, table and/or view is used for a read-only operation, a modification operation (i.e., write to, delete) or the like. Additionally, in large enterprises in which the batch processing operations are highly involved, the databases, table and or views relied upon by the tasks/jobs have a tendency to change frequently and/or change in terms of the activities associated with the databases, tables and/or views.

If the user/enterprise is unable to identify which databases, tables and/or views are used by batch processing and the activities associated therewith it poses problems to ancillary operations. For example, database administrators or like need to know when the database is being used and for how long so that database maintenance can be scheduled and performed during those periods of time in which the database is not in use (i.e., without impacting the execution of the batch processing operations).

In other instances, it is imperative for batch processing entities to be notified, when a delay in database maintenance has occurred and the conditions of the delay (e.g., what tables/data has undergone maintenance and/or what tables/data still require maintenance), so that the impact of such a delay on the batch processing operations can be assessed and actions taken to mitigate downtime and the like.

Therefore, a need exists to develop systems, methods and the like for identifying which databases, including table, views and the like are impacted by which batch processing tasks and the nature of the activities performed on the databases, tables, views and the like (e.g., which databases, tables, views are modified, which databases, tables, views are read from (and not modified) and the like). Such systems, methods and the like should be able to identify databases, tables, views and the like used in batch processing on an on-demand basis, such that as batch processing tasks evolve over time and the databases, tables, views and the activities associated therewith change the systems and methods are able to readily identify such changes. Moreover, a need exists to provide such information to database maintenance scheduling entities, such that maintenance on databases can be performed without adversely affecting batch processing execution. Conversely, when delays occur in database maintenance, a need exists to notify batch processing entities as to which are tasks/jobs are impacted by the delays and degree to which the delay impacts the tasks/jobs.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for determining which databases, database tables and views are impacted by scripts associated with batch processing tasks. Specifically, the present invention examines static script files and parses the script files and scripts contained therein using predetermined or custom patterns. In addition, the present invention examines the command line and, in some embodiments, options passed to the static script to determine how the script operates using the logic built into the script. In response to the parsing and examining of the scripts, keywords and configuration settings are identified, which are used to determine which databases, database tables and/or views are impacted by the scripts. In specific embodiments of the invention, the determination of the impact includes determining the activities/functions (e.g., read-only, modify and the like) performed on the databases, tables and/or views and accessing batch processing scheduling history data to determine when (date/time) and for how long the databases, tables and/or views are utilized/impacted. Additionally, once the impacted databases, tables and views have been identified, database impact tables are generated/modified and stored in memory. The database impact tables associate the databases, tables, views and, in some embodiments, activities performed thereon with the associated batch processing task and/or script(s). The database impact tables may be subsequently used to search and identify which databases, tables and/or views are impacted by a specified batch processing task.

In specific embodiments of the invention, in which the impact determination includes accessing batch processing scheduling history data when (date/time) and for how long the databases, tables and/or views are utilized/impacted, database maintenance scheduling may determine appropriate times for scheduling maintenance on databases or specific tables within a database, which will not adversely affect the batch processing tasks.

In other embodiments of the invention, when delays result from database maintenance or some unforeseen event, the database impact tables may be accessed to determine which batch processing tasks are associated with the databases, so that predetermined entities associated with the batch processing tasks can be alerted of the delay and information associated with the delay (e.g., which databases have completed maintenance, which databases have yet to be maintained, and the estimated time for completion of the yet-to-be maintained databases.

A system for determining database impact by batch processing tasks defines first embodiments of the invention. The system includes a first computing platform having a first memory and at least one first processor in communication with the first memory. A plurality of batch processing tasks are stored in the first memory and executable by at least one first processor, each batch processing task includes one or more script files that contain scripts.

The system additionally includes a second computing platform that is in distributed network communication with the first computing platform. The second computing platform having a second memory and at least one second processor in communication with the second memory. A database impact determining module is stored in the second memory and executable by the at least one second processor. The database impact determining module is configured to access, via the distributed computing network, one or more script files for each of the batch processing tasks and (1) parse the script files and scripts contained therein using at least one of (i) predetermined patterns, and (ii) customized patterns, and (2) examine a command line of the scripts and, in some embodiments options passed to the scripts by a batch processing scheduler to determine how logic, built into the script, operates. In response to the parsing and examining, the database impact determining module is further configured to identify at least one of (i) predetermined keywords, and (ii) types of configuration settings and determine at least one of (i) one or more databases, (ii) one or more tables in the databases, or (iii) one or more views within the databases that are impacted by each of the batch processing tasks based on the predetermined keywords and the types of configuration settings.

The module is further configured to generate/modify and store, in the second memory, database impact tables, wherein one or more of the database impact tables associates one of the plurality of batch processing tasks with databases, tables in the databases and views within the databases determined to be impacted by the corresponding batch processing task.

In specific embodiments of the system, determining the impact on the databases, tables and views includes determining actions (e.g., read-only, modify (i.e., all, delete) or the like) performed on the (i) one or more databases, (ii) one or more tables in the databases or (iii) one or more views. In further specific embodiments, determining the impact on the databases, tables and/or views includes accessing batch processing scheduling history data to determine when (e.g., date and time) and for how long (i.e., period of time) a database, table or view is utilized during the batch processing task.

In such embodiments of the system, the database impact tables that are generated/modified and stored may be configured to associate a batch processing task with the actions determined to be performed on the (i) one or more databases, (ii) one or more tables in the databases or (iii) one or more views or the date/time or duration of utilization.

In other specific embodiments of the system, the database impact determining module further comprises a database impact search sub-module that is configured to, in response to input of a batch processing task identifier (e.g., ID, name or the like), access the database impact tables to output the databases, tables and views impacted by the batch processing task associated with the batch processing task identifier. In alternate embodiments the sub-module may be configured to, in response to input of a database, table of view identifier (e.g., ID or name), access the database impact tables to output each of the bulk processing tasks that the database, table and/or view impacts.

In other specific embodiments the system further includes a third computing platform having a third memory and at least one third processor in communication with the third memory. The third computing platform is in distributed network communication with at least the second computing platform. A database maintenance scheduling module is stored in the third memory, executable by the at least one third processor. The database maintenance scheduling module is configured to communicate with the database impact determining module, via the distributed computing network, to access the information that indicates when the one or more databases, one or more tables in the databases and one or more views within the databases are utilized by the batch processing task and the length of time the batch processing task utilizes the one or more databases, one or more tables in the databases and one or more views within the database. The database maintenance scheduling module is further configured to determine, based on the information, a period of time for conducting maintenance on at least one of a database, a database table or a view.

In further embodiments of the invention the system includes a fourth computing platform having a fourth memory and at least one fourth processor in communication with the fourth memory. A database maintenance module is stored in the fourth memory, executable by the at least one fourth processor and configured to determine an occurrence of a delay in maintenance of at least one of a database, a database table or a view. In such embodiments the system further includes a fifth computing platform having a fifth memory and at least one fifth processor in communication with the fifth memory. The fifth computing platform is in distributed network communication with at least the second and fourth computing platform. A notification/alert module is stored in the fifth memory and executable by the at least one fifth processor. The notification/alert module is configured to receive indication of the occurrence of the delay in the maintenance of the at least one of a database, a database table or a view, access the database impact tables to determine one or more batch processing tasks associated with the at least one of a database, a database table or a view, and generate and initiate communication of a delay alert to one or more entities associated with the determined one or more batch processing tasks.

A computer-implemented method for determining database impact by batch processing tasks defines second embodiments of the invention. The computer-implemented method is executed by at least one computer processing device. The method includes accessing one or more script files for each of the batch processing tasks and (1) parsing the script files and scripts contained therein using at least one of (i) predetermined patterns, and (ii) customized patterns, and (2) examining a command line of the scripts and, in some embodiments, options passed to the scripts from a batch processing scheduler to determine how the logic, built into the script, operates. In response to the parsing and examining, the method includes identifying at least one of (i) predetermined keywords, and (ii) types of configuration settings and determining at least one of (i) one or more databases, (ii) one or more tables in the databases, or (iii) one or more views within the databases that impact each of the batch processing tasks based on the predetermined keywords and the types of configuration settings. The method further includes generating (or modifying existing) and storing, in computer memory, database impact tables that associate a batch processing task with databases, tables in the databases and views within the databases determined to impact the corresponding batch processing task.

In specific embodiments of the method, determining the databases, tables and/or views that impact the batch processing tasks further includes determining actions (e.g., read-only, modify (i.e., all, delete) or the like) performed on the (i) one or more databases, (ii) one or more tables in the databases or (iii) one or more views. In further specific embodiments, determining the impact on the databases, tables and/or views includes accessing batch processing scheduling history data to determine when (e.g., date and time) and for how long (i.e., period of time) a database, table or view is utilized during the batch processing task.

In such embodiments of the system, generating/modifying and storing the database impact tables further includes generating/modifying and storing the database impact tables that are configured to associate a batch processing task with the actions determined to be performed on the (i) one or more databases, (ii) one or more tables in the databases or (iii) one or more views or the date/time or duration of utilization.

In further embodiments the method includes, in response to input of a batch processing task identifier (e.g., ID, name or the like), accessing the database impact tables to output the databases, tables in the databases and views in the databases that are impacted by the batch processing task associated with the batch processing task identifier. While in other specific embodiments the method includes, in response to input of a database, table and/or view identifier (e.g., ID, name or the like), accessing the database impact tables to output the batch processing tasks that the database, tables and/or view impact.

In specific embodiments the method further includes accessing batch processing scheduling history data to determine (i) when the one or more databases, one or more tables in the databases and one or more views within the databases are utilized by the batch processing task, and (ii) a length of time that the batch processing task utilizes the one or more databases, one or more tables in the databases and one or more views within the database. In such embodiments, the method further includes generating and storing, in the second memory, information that indicates when the one or more databases, one or more tables in the databases and one or more views within the databases are utilized by the batch processing task and the length of time the batch processing task utilizes the one or more databases, one or more tables in the databases and one or more views within the database; and determining, based on the information, a period of time for conducting maintenance on at least one of a database, a database table or a view.

In still further specific embodiments the method includes, in response to determining a delay in maintenance of at least one of a database, a database table or a view, accessing the database impact tables to determine one or more batch processing tasks associated with the at least one of a database, a database table or a view, and generating and initiate communication of a delay alert to one more entities associated with the determined one or more batch processing tasks.

A computer program product including a non-transitory computer-readable medium defines third embodiments of the invention. The computer-readable medium includes a first set of codes for causing a computer to access one or more script files, each script file associated with a batch processing task. The computer-readable medium additionally includes a second set of codes for causing a computer to parse the script files and one or more scripts comprising the script files using at least one of (i) predetermined patterns, and (ii) customized patterns and a third set of codes for causing a computer to examine a command line of the scripts to determine how logic built into the script operates. The computer-readable medium additionally includes a fourth set of codes for causing a computer to, in response to the parsing and examining, identify at least one of (i) predetermined keywords, and (ii) types of configuration settings, and a fifth set of codes for causing a computer to determine at least one of (i) one or more databases, (ii) one or more tables in the databases, or (iii) one or more views within the databases that impact a corresponding batch processing task based on the predetermined keywords and the types of configuration settings. Additionally, the computer-readable medium includes a sixth set of codes for causing a computer to generate and store, in computer memory, database impact tables, wherein the database impact tables associates a batch processing task with databases, tables in the databases and views within the databases determined to impact the corresponding batch processing task.

In further embodiments of the computer program product, the computer-readable medium further included a seventh set of codes for causing a computer to determine (1) actions performed on the (i) one or more databases, (ii) one or more tables in the databases or (iii) one or more views based on the identified predetermined keywords and types of configuration settings and/or (2) when (e.g., date and time) and for how long (i.e., period of time) a database, table or view is utilized during the batch processing task.

Thus, according to embodiments of the invention, which will be discussed in greater detail below, the present invention provides for determining, on a per script basis, for each batch processing task which databases, tables and/or views are impacted by a batch processing task. Such an impact determination may entail determining which databases, tables and views are utilized during the batch processing task, what activities/functions are performed on the database, task and/or view (e.g., read-only, modify (e.g., add, delete, or the like)) and when (e.g., date and time) and for how long (i.e., period of time) a database, table or view is utilized during the batch processing task. Subsequently, database impact determination tables are created and or modified that allow for a user to search, based on batch processing task and/or database, to determine which databases have an impact of the batch processing task or which batch processing tasks are impacted by a database. Additionally, the impact determination tables may be used to determine appropriate times for conducting maintenance on databases such that the batch processing tasks are not adversely affected and/or in the event that a delay occurs during maintenance, determining which batch processing tasks may be affected by the delay and notifying/alerting entities associated with the affected batch processing tasks.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, each static script file associated with a batch processing task is examined to determine which databases, database tables and/or views are impacted by the batch processing task and, if a database, table or view is impacted, what types of activities are performed on the impacted database, table and/or view. Batch processing as used herein is a set of tasks or jobs that are executed automatically via a scheduling system to run at predetermined times (e.g., daily, weekly or the like). A "view", as used herein, is a pre-defined SQL (Structured Query Language) query against a database table, which is used to control the amount of access to a database table, as well as centralizing and packaging an expected frequently-used query.

According to embodiments of the invention, examining the script files includes parsing the script files and the scripts contained therein using predetermined patterns/templates and/or custom patterns/templates. In addition, examining the script files includes examining the command line and, in some embodiments, options passed to the static script from a batch processing scheduler in order to determine how the script will operate using the logic built into the script. Based on the parsing and examining of the command line and optional arguments passed to the script, keywords and configuration settings are identified that are used to identify the databases, tables and/or views and the impact on the databases, tables, views by the batch processing task (i.e., what activities are performed on the databases, tables and/or view, when and for how long the databases, tables and views are utilized and the like).

Once the databases, table and/or views have been identified and their impact determined, database impact tables are generated/modified, which are accessible to a user as a means of searching for and/or determining which batch processing jobs are impact which databases, table or views or, conversely, which databases, tables or views are impacted by which batch processing jobs.

According to alternate embodiments of the invention, the impact data, i.e., the database impact tables or the like may be used to determine available periods of time for conducting maintenance on a database (i.e., periods of time during which associated batch processing tasks are not scheduled to occur). In other alternate embodiments, in the event of an occurrence of a delay in the maintenance of a database, the impact data may be used to determine which batch processing tasks may be affected by the delay in the maintenance of the database and provide for notifying/alerting entities associated with the batch processing rune, so that appropriate actions may be taken.

Figure 1:
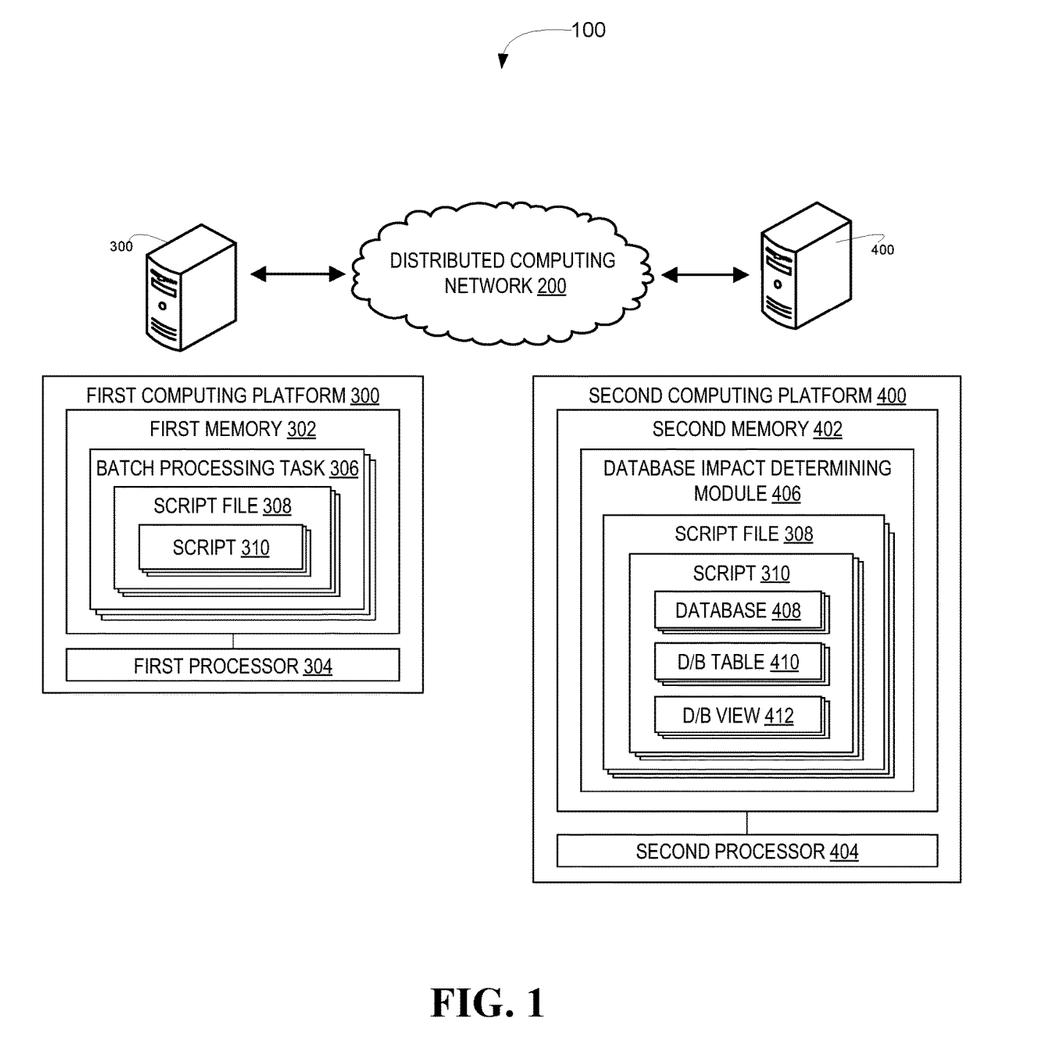
FIG. 1 provides a schematic diagram of a system for determining the impact on databases, tables and/or views by batch processing tasks, in accordance with embodiments of the invention.

Referring to FIG. 1 a schematic diagram is shown of a system 100 for determining database, table and/or view impact on batch processing tasks, in accordance with embodiments of the invention. The system 100 is implemented in a distributed computing network 200, which allows for computerized communication of data between different computing platforms, apparatus, devices and the like. The distributed computing network 200 may comprise the Internet, one or more intranets and/or a combination of the Internet and one or more intranets.

The system 100 includes a first computing platform 300, which may comprise one or more computing apparatus and/or devices, such as servers, storage components and the like. The first computing platform 300 includes a first memory 302 and at least one first processor 304 in communication the first memory 302. The first memory 302 stores a plurality of batch processing tasks 306 otherwise referred to as batch processing jobs that are configured to be automatically executed based on a predetermined schedule. In some instances, in which an enterprise has a large volume of batch processing tasks, batch processing may be executed on a continuous or near continuous basis. Each of the batch processing tasks 306 include one or more script files 308 that include one or more static scripts 310. A script, as conventionally known, is a program or sequence of instructions that is executed by another program (e.g., an application or the like) rather than by a computing processor. In a large enterprise, different computer programmers will write the scripts 310 using different programming logic to perform the requisite task. The myriad of different programming logic makes it difficult to discern what databases, database tables and views are impacted by a script 310 or script file 308 and what activities are being performed on the impacted databases, database tables and/or views.

The system 100 includes second computing platform 400 which is in network communication with the first computing platform 300 via distributed computing network 200. Similar to the first computing platform 300, the second computing platform 400 may comprise one or more computing apparatus and/or devices, such as servers, storage components and the like. Moreover, while first and second computing platforms 300 and 400 are shown and described as separate physical entities, the may be configured as one physical computing platform and/or share in the use of individual components of the computing platforms. The second computing platform 300 includes a second memory 302 and at least one second processor 304 in communication the second memory 302. The second memory 302 stores database impact determining module 406, otherwise referred to as application, tool or the like, which is configured to examine the static script files 308 and scripts 310 to determine the impact on one or more databases 408 and database tables 410 and/or views 412 included therein by batch processing tasks 306. Examining the script files 308 and scripts while they are static, as opposed to monitoring the scripts while they are executed, may be a preferred means for determining the impact on the databases 408, tables 410 and/or views 412 by the batch processing tasks. Real-time monitoring of the scripts while they are executed (i.e., while the batch processing is occurring) may not only be cost-prohibitive but may also not be pro-active, since the databases 408, tables 410 and/or views 412 that are impacted are determine while the batch processing occurs as opposed to prior to executing a batch processing run. In specific embodiments of the invention, the database impact determining module may be executed on a predetermined basis or dynamically on an as-needed basis to determine the overall impact on databases 408, tables 410 and/or views 412 by the batch processing tasks.

In specific embodiments of the invention, the database impact determining module 406 is configured to access, via the distributed computing network, the script files 308 for each of the batch processing tasks for the purpose of determining the impact on the databases 408, tables 410 and/or views 412 by the batch processing tasks. Such determination includes parsing the script files 308 and the scripts 310 included therein using one or more of (i) predetermined patterns/templates and/or (ii) customized patterns/templates to identify predetermined keywords or the like. In addition to parsing the script files 308 and scripts 310, the command line and options passed to the script 308 are examined to determine how the script will operate using the programming logic that has been written into the script. Based on the parsing and examining of the script, keywords and configuration settings are identified. The keywords and configuration settings are used to determine the impact to databases 408 and associated database tables 410 and views 412 by the batch processing tasks 306. Such impact determination may include, but is not limited to, identifying the databases 408, tables 410 and/or views 412, identifying the activities/functions performed on the databases 408, tables 410 and/or views 412 (e.g., whether the database, tables or view is being modified, read-only or the like), identifying, based on batch processing scheduling history or the like, when a databases 408, tables 410 and/or views 412 is being impacted/utilized and for how long the databases 408, tables 410 and/or views 412 is being used and the like.

As a result of determining the impact on databases 408, tables 410 and/or views 412 by the batch processing tasks 306, the database impact determining module 406 is configured to generate and store, in computing memory, database impact tables that associate the impacted databases 408, tables 410 and views 412 with the corresponding batch processing task. In this regard, the module 406 may provide for a user interface that allows a user to (i) input a database, table or view identifier to identify which batch processing tasks have an impact on the databases, tables and views or, conversely, (ii) input a batch processing task identifier to identify which databases, tables and/or views are impacted by the batch processing task.

Figure 2:
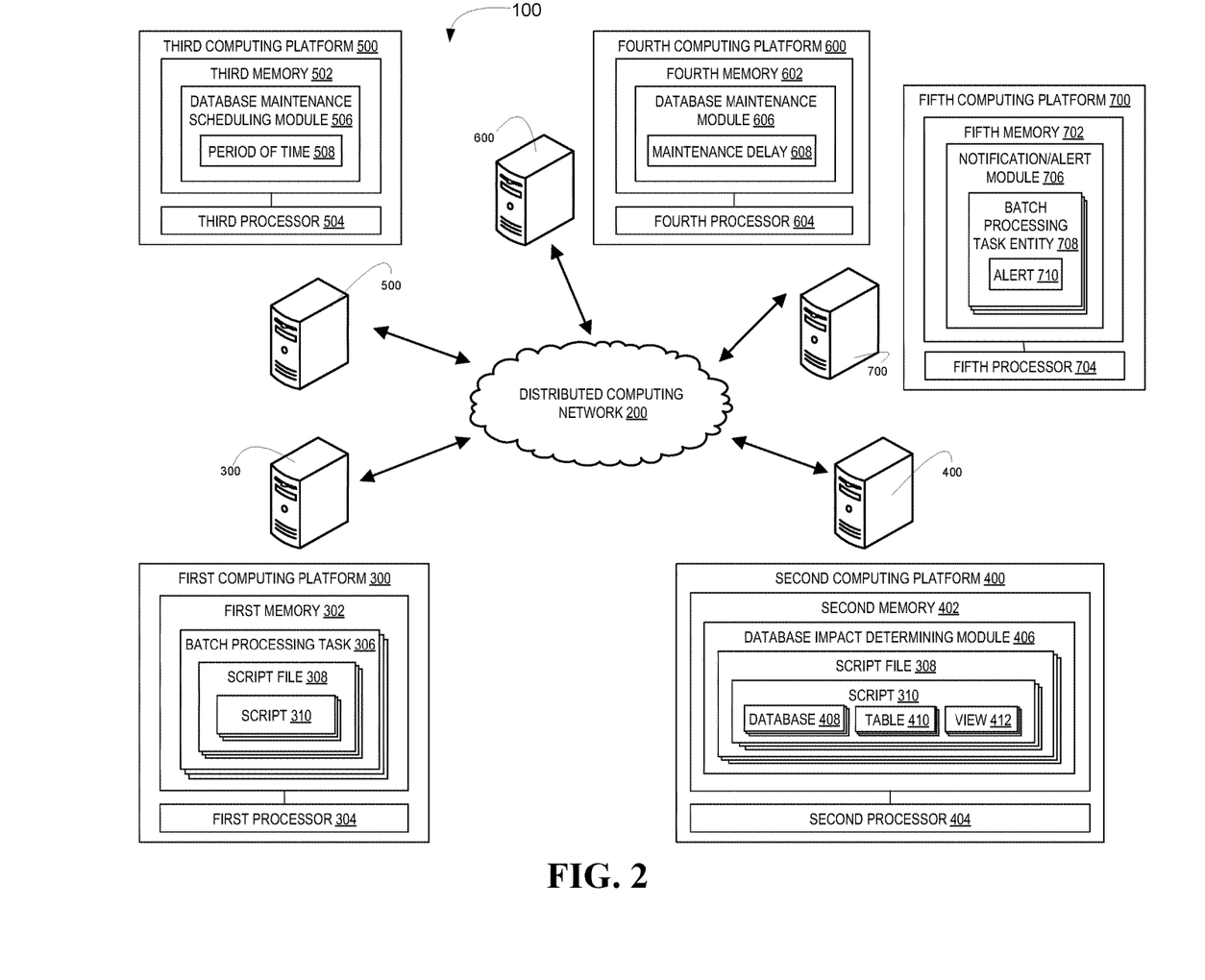
FIG. 2 provides a more detailed schematic diagram of a system for determining the impact on databases, tables and/or views by batch processing tasks, in accordance with alternate embodiments of the invention.

Referring to FIG. 2 a more detailed schematic diagram is shown of a system 100 for determining the impact on databases, tables and views by batch processing and utilizing the impact information, in accordance with alternate embodiments of the invention.

In addition to first and second computing platforms 300 and 400, the system 100 shown in FIG. 2 may include third computing platform 500, which is in network communication with at least second computing platform 400 via distributed computing network 200. Similar to the first and second computing platforms 300 and 400, the third computing platform 500 may comprise one or more computing apparatus and/or devices, such as servers, storage components and the like. Moreover, the third computing platform 500 or a portion thereof may be physically embodied in components of the first and/or second computing platforms 300 and 400. The third computing platform 500 includes a third memory 502 and at least one third processor 504 in communication the third memory 502.

The second memory 502 stores database maintenance scheduling module 506 that is configured to schedule periods of time for conducting maintenance on a databases 408, tables 410 and views 412. From time-to-time databases 408, tables 410 and views 412 require maintenance (e.g., expand the size of a database table, adding a column or row to a database table or the like), such maintenance needs to be performed during periods of time when the databases 408, tables 410 and views 412 are not being utilized by the batch processing tasks 306. As such, in accordance with specific embodiments of the invention, database maintenance scheduling module 506 is configured to access impact information determined and stored by the database impact determining module 308; specifically impact information that indicates when (e.g., data and time) the databases 408, tables 410 and views 412 are utilized by the batch processing task(s) and the length of time the batch processing task(s) utilize the databases 408, tables 410 and views 412. Based on the impact information, the database maintenance scheduling module 506 is configured to determine a period of time for conducting maintenance of a database and/or database table and/or view included therein. It should be noted that the period of time may be a future period of time for conducting the maintenance based on the impact information indicating future period of time in which the databases 408, tables 410 and views 412 are not being utilized by batch processing tasks or the period of time may be a current period of time (i.e., dynamically determined on-the-fly) based on the impact information indicating that the databases 408, tables 410 and views 412 are not currently being utilized by batch processing tasks.

Additionally, the system 100 may include fourth and fifth computing platforms 600 and 700, which is in network communication with at least second computing platform 400 via distributed computing network 200. Similar to the first, second and third computing platforms 300, 400 and 500, the fourth and fifth computing platforms 600 and 700 may comprise one or more computing apparatus and/or devices, such as servers, storage components and the like. Moreover, the fourth and fifth computing platforms 600 and 700 or a portion thereof may be physically embodied in components of the first, second and/or third computing platforms 300, 400 and/or 500.

The fourth and fifth computing platforms 600, 700 include a fourth and fifth memory 602, 702 and at least one fourth and fifth processor 604, 704 in communication with respective fourth and fifth memory 604, 704. The fourth memory stores one or more database maintenance modules 606 that are configured to perform maintenance on databases and determine an occurrence of delay 608 in the maintenance of a database, table and/or view. Delays 608 in maintenance may occur due to an unexpected hardware failure, a delay in delivery of data (both internal and/o external) and the like. When maintenance delays 608 occur downstream operations that are affected by the delay need to be notified of the delay and specific databases, tables and/or views pertaining to the delay so that appropriate actions may be taken. Specifically, such downstream operations may include entities associated with batch processing tasks that utilize the databases 408, tables 410 and/or views 412. Thus, the fifth memory stores a notification/alert module 706 that is configured to receive, from the database maintenance module(s) 606, an indication of an occurrence of a maintenance delay 608 on at least one of a database 408, table 410 and/or view 412 and, in response, access the database impact tables to determine one or more batch processing tasks 708 that are associated (i.e., utilize) the database 408, table 410 or view 412 experiencing the maintenance delay 608. In response to determining the one or more batch processing tasks, the notification module 706 is configured to generate and initiate communication of a delay alert 710 to one or more entities (e.g., lines-of-business, database administrators or the like) associated with the determined batch processing tasks 708. In addition to identifying the databases 408, tables 410 and/or views 412 experiencing the maintenance delay 608, the alert 710 may be configured to include which databases, tables or views have been maintained and an approximate time for completion of the databases 408, tables 410 and/or views 412 that have yet to be maintained (i.e., the databases 408, tables 410 and/or views 412 experiencing the delay).

Figure 3:
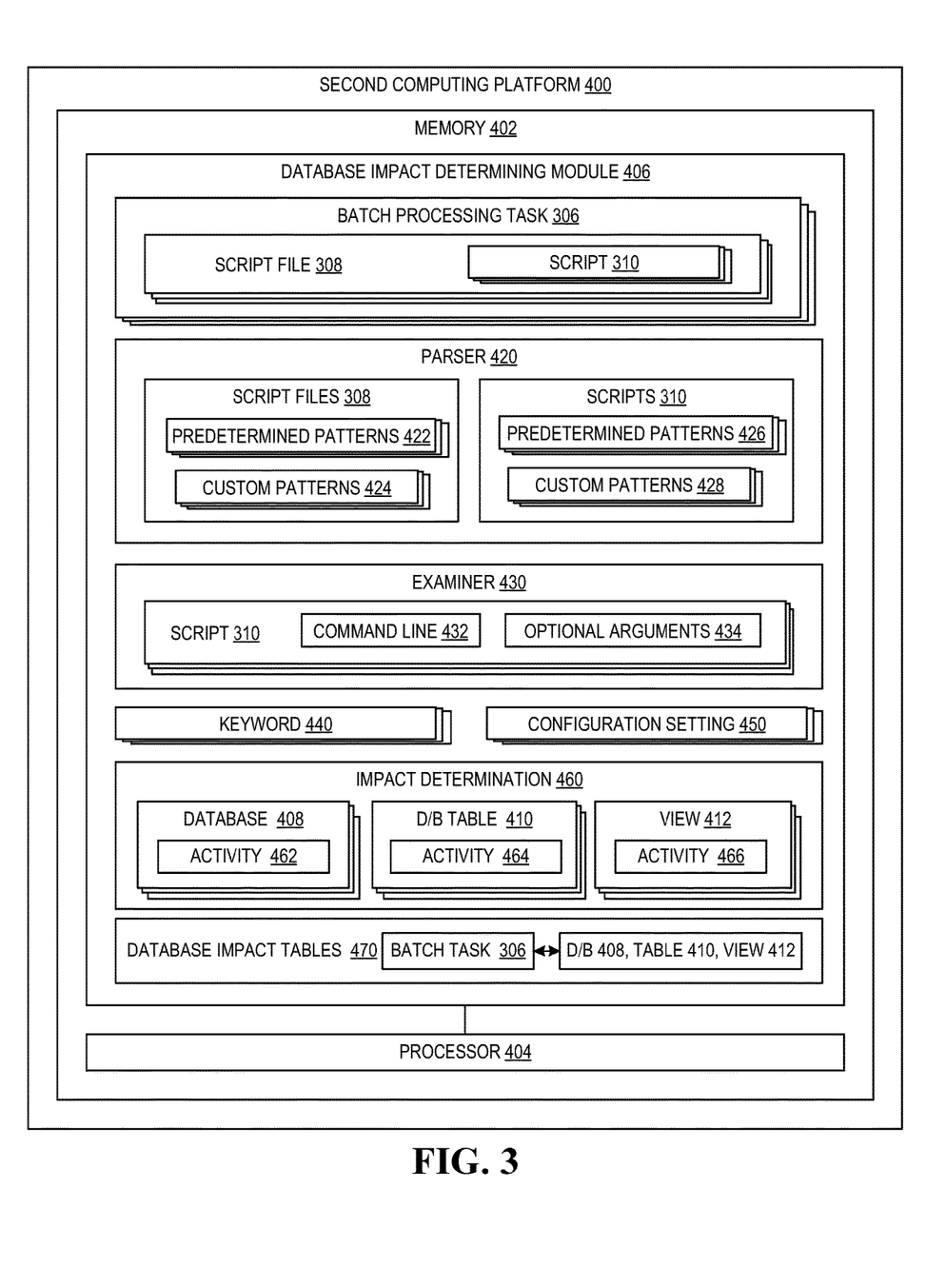
FIG. 3 provides a block diagram of an apparatus configured for determining the impact on databases, tables and/or views by batch processing tasks, in accordance with embodiments of the invention.

Referring to FIG. 3 a more detailed block diagram of the second computing platform 400 is depicted, in accordance with embodiments of the present invention. In addition to providing more details to the database impact determining module 406, FIG. 3 provides various optional embodiments of the system. The second computing platform 400, which may comprise one or more apparatus, devices is configured to execute algorithms, such as modules, routines, applications and the like. Computing platform 400 includes memory 402, which may comprise volatile and non-volatile memory, such as read-only and/or random-access memory (RAM and ROM), EPROM, EEPROM, flash cards, or any memory common to computer platforms). Moreover, memory 402 may comprise cloud storage, such as provided by a cloud storage service and/or a cloud connection service.

Further, computing platform 400 also includes processor 404, which may be an application-specific integrated circuit ("ASIC"), or other chipset, logic circuit, or other data processing device. Processor 404 may execute an application programming interface ("API") (not shown in FIG. 3) that interfaces with any resident programs, such as database impact determining module or the like stored in the memory 402 of the computing platform 400.

Processor 404 may include various processing subsystems (not shown in FIG. 3) embodied in hardware, firmware, software, and combinations thereof, that enable the functionality of the computing platform 400 and the operability of the computing platform 400 on the distributed computing network 200 (shown in FIG. 1). For example, processing subsystems allow for initiating and maintaining communications and exchanging data with other networked devices. For the disclosed aspects, processing subsystems of processor 404 may include any subsystem used in conjunction with database impact determining module 406 and related subroutines, algorithms, sub-algorithms, modules, sub-modules thereof.

Computer platform 400 may additionally include a communications module (not shown in FIG. 3) embodied in hardware, firmware, software, and combinations thereof, that enables electronic communications between the computing platform 400 and other platforms, apparatus and/or devices (shown in FIGS. 1 and 2). Thus, communication module may include the requisite hardware, firmware, software and/or combinations thereof for establishing and maintaining a network communication connection.

Memory 402 of computing platform 400 stores database impact determining module 406 that is configured to determine the impact to databases 408, database tables 410 and/or views 412 by batch processing tasks. As previously discussed, the module 406 is configured to access static script files 308 and the scripts contained therein to determine the impact to databases 408, tables 410 and views 412 by batch processing tasks. Impact determination may occur on a predetermined schedule (e.g., weekly or the like) or may occur dynamically on as as-needed basis.

The database impact determining module 406 includes parser 420 that is configured to parse the script files 308 using predetermined patterns/templates 426 and/or custom patterns/templates 428 to identify which scripts 310 within the files conduct database activities. Custom patterns/templates 424 may be implemented for those script files 308 that are not conducive to parsing with the predetermined standard patterns/templates 422 (i.e., script files that structured differently than conventional script files).

Once the scripts 310 have been identified, the scripts are parsed using other predetermined patterns/templates 422 and/or custom patterns/templates 424 to identify keywords 440 that are associated with databases (e.g., database identifiers, table identifiers, view identifiers or the like) and/or database activities (e.g., "delete" "read" "modify" "add" or the like).

In addition, database impact determining module 406 includes examiner 430 that is configured to examine (i) the command line 432 and, in some embodiments, (ii) the optional arguments 434 passed to the scripts by a batch processing scheduler. In certain script implementations the command line options may include the configuration file name, which the script acts on. In other implementations the command line options dictate the flow of the logic included in the script. For example, the script may be configured to only process a certain type of data (e.g., data originating from a defined country or continent).

In other script embodiments the optional arguments determine how the script functions, i.e., which configuration file script is used to perform operations and which SQL scripts are utilized to access the database tables. In this regard, the examiner 430 examines the query language and the statements used in the configuration file scripts to determine what actions are being performed on the database tables. As such, the examiner 430 identifies keywords used in the query language that indicate the activity (e.g., "update," "read," "delete" and the like).

If the examiner 430 determines that a script uses a configuration file, a list of configuration settings 450 that the script references is identified. In some implementations of the script 310 the list of settings may comprise name and value pairs, in which the name is associated with a property and the value is associated with an activity. As such, the name and value pair is determinative of the database that the script accesses and the type of activity that the script is configured to perform. In other implementations of the script 310 the list of configuration settings 450 may comprise a record de-limited into multiple fields (i.e., a name is not associated with a field). In such instances, the header of the configuration file is examined to determine the configuration of the script, which is used to determine databases, database tables and/or views.

As a result of the parsing and the examining of the script files and scripts, the module 406 determines the impact 460 to databases 408, database tables 410 and/or views 412 by the batch processing task 306. In this regard, the databases 408, database tables 410 and/or views 412 are identified, as well as the corresponding activities 462, 464, 466, otherwise referred to as actions or functions, performed on databases 408, database tables 410 and/or views 412. As previously noted, the activities may include, but are not limited to modifying a database, table or view (e.g., adding, deleting or changing data fields), read-only and the like. In addition, batch processing scheduling history data may be accessed to determine when (e.g., data and time) databases, tables and/or views are accessed and for how long (e.g., period of time).

In specific embodiments of the invention, the output of the database impact determination module 400 is a conventional CSV (Comma Separated Value) file, which includes a plurality of records with each record including a plurality of fields. The CSV file is inputted to a loading function, which loads the data in the file into a database. In specific embodiments of the invention the database stores database impact tables 470 that serve to associate the batch processing tasks 306 with the databases 408, tables 410 and/or views 412 that the task utilizes, as well as, activities 462, 464, 466 performed on the databases 408, tables 420 and/or views 412. In other embodiments of the invention, the database impact tables 470 also serve to associate the impacted databases 408, tables 410 and/or views 412 and the activities 462, 464, 466 performed thereon by batch processing tasks.

In this regard, the database impact determining module or some other sub-module may provide for a user interface that allows a user to perform a search function, in which the user inputs a batch processing identifier (e.g., ID or name) or database/table/view identifier (e.g., ID or name) and, in response, the module outputs the databases 408, tables 410 and/or views 412 utilized by the batch processing task and associated activities 462, 464, 466, or the batch processing tasks that utilize the database 408 table 410 and view 412.

Figure 4:
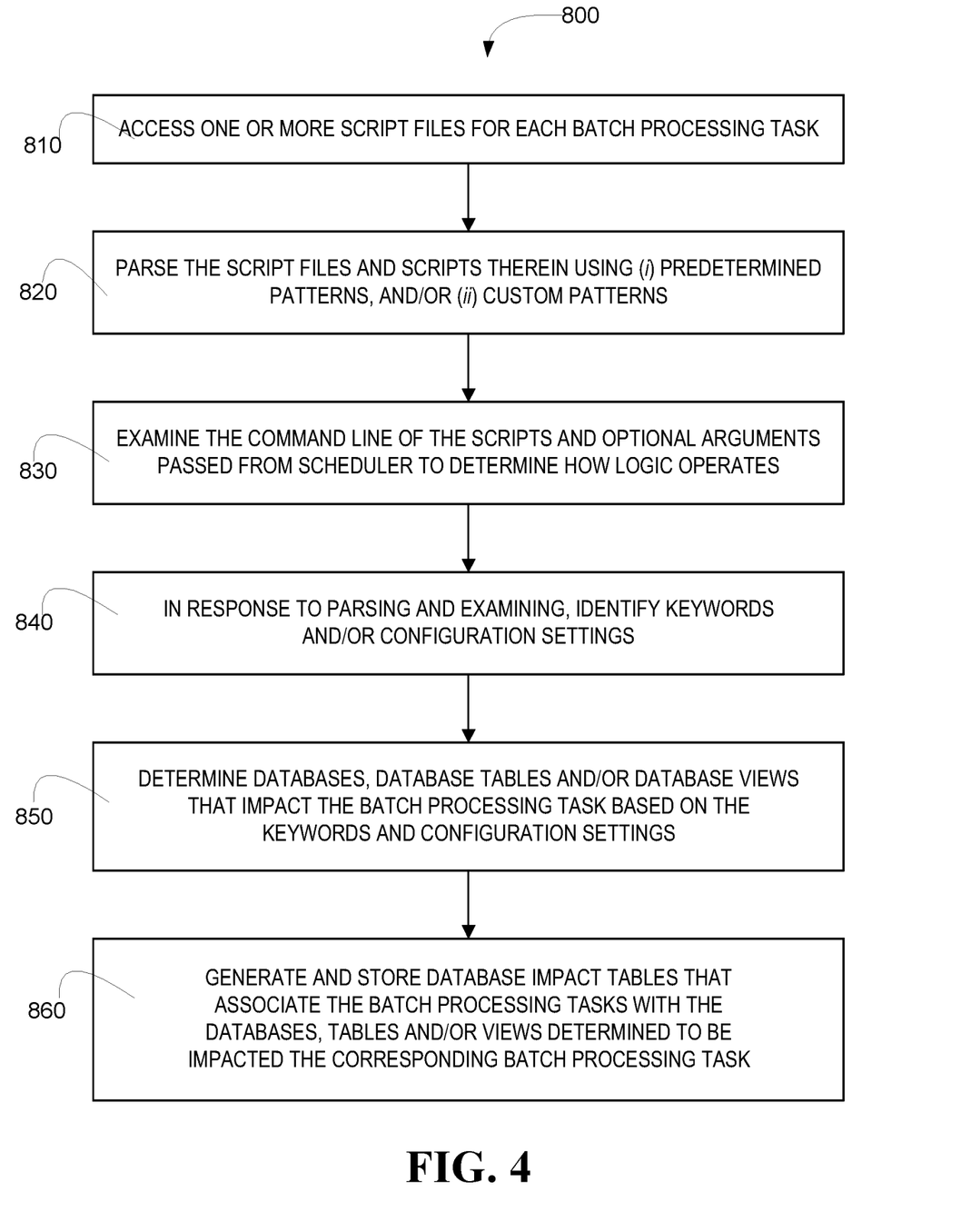
FIG. 4 provides a flow diagram of a method for determining the impact on databases, tables and/or views by batch processing tasks, in accordance with embodiments of the invention.

Referring to FIG. 4, a flow diagram is presented of a method 800 for determining the impact on databases, tables and/or views by batch processing tasks, in accordance with embodiments of the invention. At Event 810, one or more script files for each batch processing task are accessed. In this regard the database impact determination process is typically performed across all of the batch processing tasks that occur within an enterprise or, in some embodiments of the invention, a sub-set of all the batch processing tasks that occur within an enterprise (e.g., batch processing tasks associated with a specific division within an enterprise or the like). As previously noted, the impact determination process typically occurs on a regular interval (e.g., weekly), although in other instances the process may occur dynamically on an as-needed basis.

At Event 820, the static script files and the scripts included within the script files are parsed using predetermined patterns and/or custom patterns. Parsing results in keywords that identify the databases, tables and/or views and the activities performed on the databases, tables and/or views. In specific embodiments of the invention, the script files are parsed to identify which scripts are associated with databases, tables and/or views and, the identified scripts are then parsed to determine the activities performed on the databases, tables and/or views.

At Event 830, the command line of the scripts and optional arguments passed from the scheduler are examined to determine how the logic built into the scripts operates. In certain script implementations the command line options may include the configuration file name while in other implementations the command line dictates how the logic included in the script functions, e.g., which configuration file script is used to perform operations and which SQL scripts are utilized to access the database tables. Examining the command line and optional arguments may include, in some script implementations, examining the query language and the statements used in the configuration file scripts to determine what actions are being performed on the database tables. If the script uses a configuration file, a list of configuration settings that the script references is identified. In some implementations of the script the list of settings may comprise name and value pairs, in which the name is associated with a property and the value is associated with an activity. In other implementations of the script 310 the list of configuration settings 450 may comprise a record delimited into multiple fields. In such instances, the header of the configuration file is examined to determine the configuration of the script, which is used to determine databases, database tables and/or views.

At Event 840, as a result of the parsing and examining, keywords associated with databases, tables, views and/or associated activities are identified, as well as configurations settings associated with database, table and/or view activities are identified. At Event 850, the impacts to the databases, tables and views by the batch processing tasks are determined based on the keywords and the configuration settings. The impact may include the identity of the databases, tables and views, as well as, the activities/functions performed on the databases, tables and views. In additional embodiments determining the impact may include accessing batch processing scheduling history to determine when (date, time) the database, table and/or view is utilized by the batch processing task and for how long (period of time).

At Event 850, database impact tables are generated or modified and stored in computing memory. The database impact tables associate a batch processing task with the databases, tables and/or views (and, in some embodiments, activities performed thereon) utilized by the task and associate the database, tables and views with the batch processing tasks that utilize the corresponding database, table, views. In this regard, the database impact tables provide for a searchable database, wherein a user can input a batch processing identifier to search for and identify the databases, tables and views utilized by the batch processing task and the activities performed on the databases, tables and views or, conversely, input a database, table or view identifier to search for and identify the batch processing tasks which utilize the database, table or view.

In additional embodiments of the method, a database maintenance scheduling system may access the impact information that indicated when and how long the databases, tables and/or views are being utilized by the batch processing tasks to determine and optimal time for performing maintenance on a database, table or view. The optimal time may be a time that does not adversely affect the batch processing tasks that utilize the databases, tables and/or views.

In other embodiments of the method, occurrence of a delay in database maintenance may trigger accessing the impact information, e.g., database impact tables or the like to determine which batch processing tasks are associated with the database, tables or views and, in response to the determination, generating and initiating communication of alerts to entities associated with the batch processing tasks (e.g., lines-of-business and the like) that notify the entities of the delay, including which databases are affected, which databases have completed maintenance, which databases have yet to complete maintenance and the estimated time for completing maintenance.

Thus, as described above, embodiments of the present invention provide for identifying, for each script file associated with a batch processing task, databases, database table and views utilized by the scripts and the impact of the utilization in terms of what activities/functions are performed on the databases, database table and/or views and the when and for how long the databases, database table and/or views are utilized.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for determining an impact on database, database tables and/or views by batch processing tasks, the system comprising:
 a first computing platform including a first memory and at least one first processor in communication with the first memory;
 a plurality of batch processing tasks stored in the first memory and executable by the at least one first processor, each batch processing task including one or more script files comprising scripts;
 a second computing platform including a second memory and at least one second processor in communication with the second memory, wherein the second computing platform is in distributed network communication with the first computing platform; and
 a database impact determining module stored in the second memory, executable by the at least one second processor and configured to:
  access, via the distributed computing network, one or more script files for each of the batch processing tasks;
  parse the script files and one or more scripts comprising the script files using at least one of (i) predetermined patterns, and (ii) customized patterns,
  examine a command line of the scripts to determine how logic built into the script operates,
  in response to the parsing and examining, identify, for at least one of one or more of the script files or one or more of the scripts, at least one of (i) predetermined keywords, and (ii) types of configuration settings, determine at least one of (i) one or more databases, (ii) one or more tables in the databases, or (iii) one or more views within the databases that are impacted by one or more batch processing tasks based on the predetermined keywords and the types of configuration settings, and generate and store, in the second memory, database impact tables, wherein one or more of the database impact tables associates one of the plurality of batch processing tasks with databases, tables in the databases and views within the databases determined to be impacted by the corresponding batch processing task.

2. The system of claim 1, wherein the database impact determining module is further configured to determine actions performed on the (i) one or more databases, (ii) one or more tables in the databases or (iii) one or more views based on the identified predetermined keywords and types of configuration settings.

3. The system of claim 2, wherein the database impact determining module is further configured to generate and store, in the second memory, the database impact tables, wherein one or more of the database impact tables associates one of the plurality of batch processing tasks with the actions determined to be performed on the (i) one or more databases, (ii) one or more tables in the databases or (iii) one or more views based on the identified predetermined keywords and types of configuration settings.

4. The system of claim 1, wherein the database impact determining module is further configured to examine one or more options passed to the scripts from a batch processing scheduler.

5. The system of claim 1, wherein the database impact determining module further comprises a database impact search sub-module configured to, in response to input of a batch processing task identifier, access the database impact tables to provide databases, tables in the databases and views impacted by the batch processing task associated with the batch processing task identifier.

6. The system of claim 1, wherein the database impact determining module is further configured to:

access batch processing scheduling history data, to determine (i) when the one or more databases, one or more tables in the databases and one or more views within the databases are utilized by the batch processing task, and (ii) a length of time that the batch processing task utilizes the one or more databases, one or more tables in the databases and one or more views within the database, and store, in the second memory, information that indicates when the one or more databases, one or more tables in the databases and one or more views within the databases are utilized by the batch processing task and the length of time the batch processing task utilizes the one or more databases, one or more tables in the databases and one or more views within the database.

7. The system of claim 6, further comprising:

a third computing platform including a third memory and at least one third processor in communication with the third memory, wherein the third computing platform is in distributed network communication with at least the second computing platform; and a database maintenance scheduling module stored in the third memory, executable by the at least one third processor and configured to:

communicate with the database impact determining module, via the distributed computing network, to access the information that indicates when the one or more databases, one or more tables in the databases and one or more views within the databases are utilized by the batch processing task and the length of time the batch processing task utilizes the one or more databases, one or more tables in the databases and one or more views within the database, and determine, based on the information, a period of time for conducting maintenance on at least one of a database, a database table or a view.

8. The system of claim 7, further comprising:

a fourth computing platform including a fourth memory and at least one fourth processor in communication with the fourth memory;

a database maintenance module stored in the fourth memory, executable by the at least one fourth processor and configured to:

determine a delay in maintenance of at least one of a database, a database table or a view.

9. The system of claim 8, further comprising:

a fifth computing platform including a fifth memory and at least one fifth processor in communication with the fifth memory, wherein the fifth computing platform is in distributed network communication with at least the second and fourth computing platform;

a notification module stored in the fifth memory, executable by the at least one fifth processor and configured to:

receive indication of the determined delay in the maintenance of the at least one of a database, a database table or a view, access the database impact tables to determine one or more batch processing tasks associated with the at least one of a database, a database table or a view, and generate and initiate communication of a delay alert to one more entities associated with the determined one or more batch processing tasks.

10. A computer-implemented method for determining an impact on databases, database tables and/or views by batch processing tasks, wherein the computer-implemented method comprising the following steps executed by at least one computer processing device:

accessing one or more script files for each of the batch processing tasks;

parsing the script files and one or more scripts comprising the script files using at least one of (i) predetermined patterns, and (ii) customized patterns;

examining a command line of the scripts to determine how logic built into the script operates;

in response to the parsing and examining, identifying, for at least one of one or more of the script files or one or more of the scripts, at least one of (i) predetermined keywords, and (ii) types of configuration settings;

determining at least one of (i) one or more databases, (ii) one or more tables in the databases, or (iii) one or more views within the databases that are impacted by one or more batch processing tasks based on the predetermined keywords and the types of configuration settings, and generating and storing, in computer memory, database impact tables, wherein one or more of the database impact tables associates one of the plurality of batch processing tasks with databases, tables in the databases and views within the databases determined to be impacted by the corresponding batch processing task.

11. The method of claim 10, further comprising determining actions performed on the (i) one or more databases, (ii) one or more tables in the databases or (iii) one or more views based on the identified predetermined keywords and types of configuration settings.

12. The method of claim 11, wherein generating and storing, in the computer memory, the database impact tables further comprises generating and storing, in the computer memory, one or more of the database impact tables that associate one of the plurality of batch processing tasks with the actions determined to be performed on the (i) one or more databases, (ii) one or more tables in the databases or (iii) one or more views based on the identified predetermined keywords and types of configuration settings.

13. The method of claim 10, wherein examining further comprises examining one or more options passed to the scripts from a batch processing scheduler.

14. The method of claim 10, further comprising, in response to input of a batch processing task identifier, accessing the database impact tables to provide databases, tables in the databases and views impacted by the batch processing task associated with the batch processing task identifier.

15. The method of claim 10, further comprising:
accessing batch processing scheduling history data to determine (i) when the one or more databases, one or more tables in the databases and one or more views within the databases are utilized by the batch processing task, and (ii) a length of time that the batch processing task utilizes the one or more databases, one or more tables in the databases and one or more views within the database; and
generating and storing, in the second memory, information that indicates when the one or more databases, one or more tables in the databases and one or more views within the databases are utilized by the batch processing task and the length of time the batch processing task utilizes the one or more databases, one or more tables in the databases and one or more views within the database; and
determining, based on the information, a period of time for conducting maintenance on at least one of a database, a database table or a view.

16. The method of claim 15, further comprising:
in response to determining a delay in maintenance of at least one of a database, a database table or a view, accessing the database impact tables to determine one or more batch processing tasks associated with the at least one of a database, a database table or a view, and generating and initiate communication of a delay alert to one more entities associated with the determined one or more batch processing tasks.

17. A computer program product including a non-transitory computer-readable medium, the computer-readable medium comprising:
a first set of codes for causing a computer to access one or more script files, each script file associated with a batch processing task;
a second set of codes for causing a computer to parse the script files and one or more scripts comprising the script files using at least one of (i) predetermined patterns, and (ii) customized patterns;
a third set of codes for causing a computer to examine a command line of the scripts to determine how logic built into the script operates;
a fourth set of codes for causing a computer to, in response to the parsing and examining, identify, for at least one of one or more of the script files or one or more of the scripts, at least one of (i) predetermined keywords, and (ii) types of configuration settings;
a fifth set of codes for causing a computer to determine at least one of (i) one or more databases, (ii) one or more tables in the databases, or (iii) one or more views within the databases that are impacted by one or more batch processing tasks based on the predetermined keywords and the types of configuration settings; and
a sixth set of codes for causing a computer to generate and store, in computer memory, database impact tables, wherein one or more of the database impact tables associates a batch processing task with databases, tables in the databases and views within the databases determined to be impacted by the corresponding batch processing task.

18. The computer program product of claim 17, wherein the computer-readable medium further comprises a seventh set of codes for causing a computer to determine actions performed on the (i) one or more databases, (ii) one or more tables in the databases or (iii) one or more views based on the identified predetermined keywords and types of configuration settings.

19. The computer program product of claim 17, wherein the sixth set of codes is further configured to cause the computer to generate and store, in the computer memory, one or more of the database impact tables that associate one of the plurality of batch processing tasks with the actions determined to be performed on the (i) one or more databases, (ii) one or more tables in the databases or (iii) one or more views based on the identified predetermined keywords and types of configuration settings.

20. The computer program product of claim 17, wherein the third set of codes is further configured to cause the computer to examine one or more options passed to the scripts from a batch processing scheduler.

* * * * *